US008266700B2

(12) United States Patent
Sima et al.

(10) Patent No.: US 8,266,700 B2
(45) Date of Patent: *Sep. 11, 2012

(54) SECURE WEB APPLICATION DEVELOPMENT ENVIRONMENT

(75) Inventors: Caleb Sima, Woodstock, GA (US); Timothy Farley, Atlanta, GA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1442 days.

This patent is subject to a terminal disclaimer.

(21) Appl. No.: 10/908,520

(22) Filed: May 16, 2005

(65) Prior Publication Data

US 2006/0259973 A1 Nov. 16, 2006

(51) Int. Cl.
G06F 11/00 (2006.01)
(52) U.S. Cl. ............... 726/25; 726/22; 726/23; 726/24; 713/188
(58) Field of Classification Search ............... 726/25
See application file for complete search history.

(56) References Cited

U.S. PATENT DOCUMENTS

| 5,974,572 | A | * | 10/1999 | Weinberg et al. | 714/47.2 |
| 6,006,328 | A | | 12/1999 | Drake | |
| 6,513,154 | B1 | * | 1/2003 | Porterfield | 717/101 |
| 6,668,340 | B1 | * | 12/2003 | Baker et al. | 714/38.1 |
| 6,971,026 | B1 | * | 11/2005 | Fujiyama et al. | 726/25 |
| 6,980,927 | B2 | * | 12/2005 | Tracy et al. | 702/181 |
| 7,299,359 | B2 | * | 11/2007 | Hurley | 713/182 |
| 7,343,626 | B1 | * | 3/2008 | Gallagher | 726/25 |
| 7,814,308 | B2 | * | 10/2010 | Templin et al. | 713/152 |
| 7,831,995 | B2 | | 11/2010 | Futoransky et al. | |
| 7,877,780 | B2 | * | 1/2011 | Kolawa et al. | 726/1 |
| 2002/0010855 | A1 | * | 1/2002 | Reshef et al. | 713/164 |
| 2002/0040364 | A1 | | 4/2002 | Saito et al. | |
| 2002/0133807 | A1 | * | 9/2002 | Sluiman | 717/124 |
| 2003/0093717 | A1 | * | 5/2003 | Mason | 714/38 |
| 2003/0159063 | A1 | * | 8/2003 | Apfelbaum et al. | 713/200 |
| 2003/0233581 | A1 | * | 12/2003 | Reshef et al. | 713/201 |
| 2004/0107415 | A1 | * | 6/2004 | Melamed et al. | 717/124 |
| 2005/0138426 | A1 | * | 6/2005 | Styslinger | 713/201 |
| 2005/0257267 | A1 | | 11/2005 | Williams et al. | |
| 2005/0267928 | A1 | * | 12/2005 | Anderson et al. | 709/200 |
| 2005/0273861 | A1 | * | 12/2005 | Chess et al. | 726/25 |
| 2006/0069671 | A1 | * | 3/2006 | Conley et al. | 707/3 |
| 2006/0101334 | A1 | * | 5/2006 | Liao et al. | 715/523 |
| 2006/0143688 | A1 | * | 6/2006 | Futoransky et al. | 726/1 |
| 2006/0195588 | A1 | * | 8/2006 | Pennington et al. | 709/227 |
| 2006/0225124 | A1 | * | 10/2006 | Kolawa et al. | 726/1 |
| 2006/0230289 | A1 | * | 10/2006 | Fox et al. | 713/188 |
| 2006/0282494 | A1 | * | 12/2006 | Sima et al. | 709/200 |
| 2007/0061877 | A1 | * | 3/2007 | Sima et al. | 726/12 |
| 2007/0101409 | A1 | | 5/2007 | Palekar et al. | |
| 2007/0186285 | A1 | * | 8/2007 | Hurst et al. | 726/25 |

OTHER PUBLICATIONS

Takanen et al., "Agents of Responsibility in Software Vulnerability Processes," 2004, Kluwer Academic Publishers, pp. 93-110.*
Malaiya, "Software Reliability and Security," 2005, Taylor & Francis, pp. 1-12.*
Krsul, "Software Vulnerability Analysis," 1998, Purdue University, pp. 47-90.*

(Continued)

Primary Examiner — Luu Pham

(57) ABSTRACT

Various embodiments of systems, methods, software tools, etc. for providing secure web application development are provided. One embodiment comprises a method for developing a secure web application. One such method comprises: analyzing code associated with a web application to identify at least one vulnerable input; and validating the at least one vulnerable input.

17 Claims, 5 Drawing Sheets

OTHER PUBLICATIONS

Tevis et al., "Methods for the Prevention, Detection and Removal of Software Security Vulnerabilities," 2004, ACM, pp. 197-201.*
Lucca et al., "Identifying Corss Site Scripting Vulnerabilities in Web Application," 2004, IEEE, pp. 1-10.*
International Bureau, International Preliminary Report on Patentability, 8 pages.
Sima et al., Office Action dated Aug. 3, 2009; U.S. Appl. No. 11/465,916, filed Aug. 21, 2006, 11 p.
Sima et al., Response to Office Action dated Aug. 3, 2009 filed Nov. 3, 2009; U.S. Appl. No. 11/465,916, filed Aug. 21, 2006, 14 p.
Sima et al., Final Office Action dated Mar. 1, 2010; U.S. Appl. No. 11/465,916, filed Aug. 21, 2006, 14 p.
Sima et al., Appeal Brief filed Jun. 28, 2010; U.S. Appl. No. 11/465,916, filed Aug. 21, 2006, 27 p.
Sima et al., Office Action dated Sep. 16, 2010; U.S. Appl. No. 11/465,916, filed Aug. 21, 2006, 11 p.
S.P.I. Dynamics Inc. et al.; International Preliminary Report on Patentability dated Mar. 5, 2009; PCT/US/2007/076371, filed Aug. 21, 2007, 8 p.

* cited by examiner

SECURE WEB APPLICATION DEVELOPMENT ENVIRONMENT

BACKGROUND OF THE INVENTION

Security and the protection of digital assets is a key enabler of our information-driven economy. The information security industry has evolved from a niche corner of information technology to something that pervades the industry itself. Despite this increased attention to security, the complexity of information systems and the reliance upon them creates a fragility that adds up to risk to organizations of all sizes. Vulnerabilities are inherent in nearly everything, and computer systems are no exception. Software vulnerabilities have many different origins. For instance, in some cases, a coding standard can be poorly written, which may cause all software written to these specifications to be faulty.

Bugs are an inevitable reality of the software development process, and some of these bugs can create serious vulnerabilities. Additional vulnerabilities may be introduced when a system is installed, configured, and customized for individual use. In general, any stage during the software development and usage lifecycles creates risk for the introduction of vulnerabilities. Some vulnerabilities are innocuous and some can be critical in nature. Identifying the key risks and their solutions is one of the most critical aspects of information security.

Research has historically shown that successful malicious penetrations upon computer systems and well known worms and viruses have been based upon known vulnerabilities. Vulnerabilities may exist at any aspect of computing systems. For instance, vulnerabilities may exist in typical desktop applications and/or operating systems, network layer components, etc. Furthermore, vulnerabilities may exist at the application layer, which may include weaknesses created by the integration of one or more application components, including in-house custom programming, operating systems, databases, web pages, and middleware. These vulnerabilities are potentially unique to each integrated system and can be added and removed dynamically with each change to any system component.

Currently, there are various vulnerability assessment solutions that enable information technology (IT) professionals to proactively address vulnerabilities at various aspects of computing systems, including network layer, application layer, etc. By way of example, various tools exist for identifying security vulnerabilities in computing systems. Anti-virus tools exist for determining desktop vulnerabilities in applications, operating systems, etc. Within the web application space, various assessment tools also exist, which may employ various heuristics to identify vulnerabilities in web applications. Typically, web application assessment tools have the ability to identify dynamic "unique" vulnerabilities using adaptive and behavioral techniques, as well as standard "static" vulnerabilities. Web application assessment tools may map an entire web system, including all links, proprietary code, connections to data sources, etc.

One common technique that is employed by adverse parties is the manipulation of data inputs. For instance, an adverse party may manipulate the data inputs by providing overlong inputs, improperly formatted inputs, embedded control characters, etc. Using such techniques, vulnerabilities can be exploited. Thus, it is important to have a technique for accessing the data value vulnerability of a system.

Despite the existence of various types of proactive tools for assessing vulnerabilities in computing systems, there is a need for improved systems, methods, software, etc. for providing secure web application development.

BRIEF SUMMARY OF THE INVENTION

Various embodiments of systems, methods, software tools, etc. for providing secure web application development are provided. One embodiment comprises a method for developing a secure web application. One such method comprises: analyzing code associated with a web application to identify at least one vulnerable input; and validating the at least one vulnerable input.

Another embodiment is a web application development environment comprising: an input identification module that analyzes web application code to identify vulnerable user inputs; and a validation module that validates the vulnerable user inputs identified by the input identification module.

Yet another embodiment is a system for developing a secure web application. One such system comprises: a web application development environment; and a user input validator integrated with the web application development environment, the user input validator comprising: logic configured to analyze code associated with a web application being developed via the web application development environment; logic configured to identify vulnerable user inputs in the web application; and logic configured to automatically validate the identified vulnerable user inputs.

DETAILED DESCRIPTION OF THE INVENTION

Various embodiments of systems, methods, software tools, etc. are provided for implementing a secure web application development environment. Numerous embodiments are described below with reference to FIGS. 1-6. As an introductory matter, however, one example of a secure web application development environment will be briefly described. In general, the secure web application development environment comprises software tool(s), logic, functionality, etc. for validating input-related data (or other vulnerabilities) associated with a web application during the development process (i.e., within the development environment). The validation logic may automatically validate the input-related data or, in some embodiments, may support an interactive validation wizard. In further embodiments, the validation logic may be implemented as secure object components that may be dropped into the web application for verifying, validating, etc. the inputs and vulnerabilities. Thus, one aspect of the present invention is to identify vulnerabilities during the application development, and then generate code or objects that can be embedded within the web application and that operate to verify, validate and/or remediate data inputs.

The validation logic may be implemented during the initial development process to enable a developer to develop secure web applications. In these embodiments, the secure web application development environment may further comprise input identification logic for analyzing the code associated with the web application during the development process. The input identification logic identifies the inputs and/or vulnerabilities associated with the code. The input identification logic interfaces with the validation logic. In this manner, the input identification logic passes the inputs, vulnerabilities, etc. to the validation logic to be validated. As described in more detail below, the secure web application development environment may also be integrated with a web application assessment tool. The web application assessment tool identifies the inputs, vulnerabilities, etc. to be validated, and passes them to the development environment for validation, remediation, etc.

Figure 1:
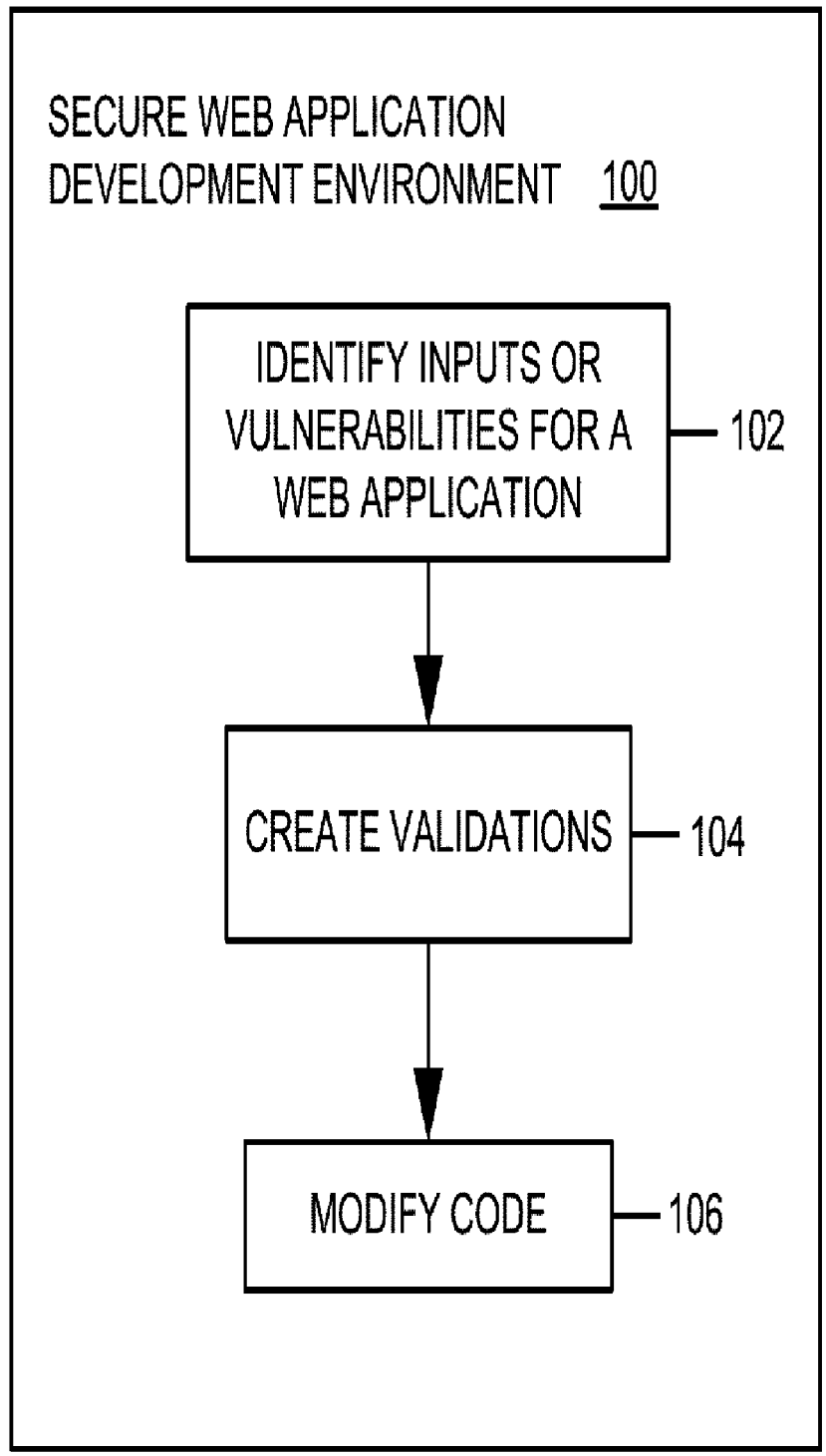
FIG. 1 is a block diagram illustrating one embodiment of a secure web application development environment.

FIG. 1 illustrates the architecture, operation, and/or functionality of one of a number of embodiments of a secure web application development environment 100. As the name suggests, secure web application development environment 100 targets web application security from within the development environment. Secure web application development environment 100 may be implemented with any of a variety of web development platforms. In one embodiment, secure web application development environment 100 is implemented using Microsoft ASP.NET. One of ordinary skill in the art will appreciate, however, that other web development platforms may be used (e.g., JavaServer Pages, ColdFusion, Microsoft Internet Information Services (IIS), Apache-based server scripts, hypertext preprocessor (PHP) scripts, etc.).

Referring to FIG. 1, at block 102, logic associated with secure web application development environment 100 identifies inputs, vulnerabilities, etc. associated with the web application being developed. This input identification logic may be configured to identify the inputs and/or vulnerabilities in a number of ways. For instance, in one implementation, the input identification logic analyzes the code associated with the web application. It should be appreciated that the code analysis may be performed on source code (e.g., HTML, ASP, etc.), either on the server side or client side. The input identification logic may also perform a static analysis on the binaries. As described in more detail below, the input identification logic may also identify the inputs, vulnerabilities, etc. via data provided by a web application assessment tool. In further embodiments, the input identification logic may be implemented using secure object components, each of which may be configured to identify specific types of inputs, vulnerabilities, etc. associated with the web application.

After the inputs and/or vulnerabilities are identified, at block 104, additional logic is generated or made available to the development environment for the creation of a secure web application 100 that can perform the validation. The validation process involves looking at the input data to determine bad or erroneous inputs. Each input is associated with a type of data. For instance, the inputs can be email addresses, street names, zip-codes, user identifications, etc. Each input has an associated pattern that can be used to verify or identify a match with the data type. For instance, an alphanumeric string, followed by a "@" character, followed by another alphanumeric string and ending in a known dot extension (i.e., .com, .net, .edu, .gov, etc) is a pattern that matches with an email address data type. Thus, in one embodiment, the additional logic is code or objects that can be directly linked or incorporated into the web application code and, when executed provides the vulnerability security. At block 106, further logic associated with secure web application development environment 100 modifies the code associated with the web application to implement code that operates to validated inputs.

Figure 2:
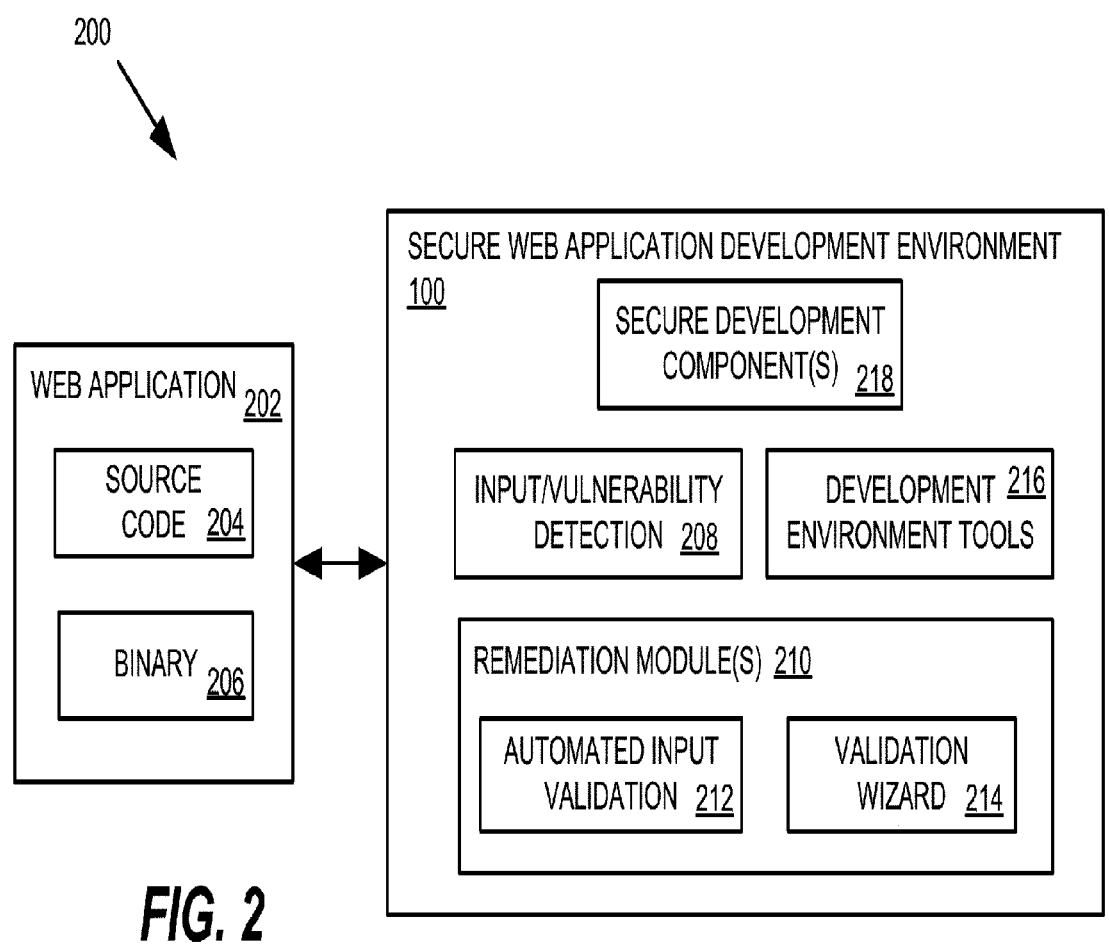
FIG. 2 is a block diagram illustrating one embodiment of a system containing a secure web application development environment.

FIG. 2 illustrates a system 200 in which an embodiment of secure application development environment 100 may be implemented. As illustrated in FIG. 2, secure application development environment 100 interfaces with source code 204 and/or binary 206 associated with a web application 202. In the embodiment illustrated in FIG. 2, secure application development environment 100 comprises an input/vulnerability detection module 208, development environment tools 216, and remediation module(s) 210. Development environment tools 216 comprise the various tools associated with the particular development platform (e.g., code editor, debugger, GUI builder, compiler, various visual tools, etc.).

Input/vulnerability detection module 208 comprises the logic, functionality, etc. for scanning web application 202 and identifying input-related data and/or vulnerabilities associated with web application 202. Remediation module(s) 210 comprise the logic, functionality, etc. for validating, repairing, remediating, or otherwise resolving the web application vulnerabilities. As illustrated in FIG. 2 and described in more detail below, remediation module(s) 210 may comprise various mechanisms for resolving the vulnerabilities. An automated input validation module 212 may be employed which supports automatic resolution of the vulnerabilities. A validation wizard 214 may be used to provide an interactive means for resolving the vulnerabilities.

As mentioned above, input/vulnerability detection module 208 may perform a code analysis on source code 204 or binary 206. As illustrated in FIG. 2, input/vulnerability detection module 208 may support various secure development components 218.

One embodiment of a secure development component 218 comprises an input validation component. The input validation component may be configured to check, for instance, incoming data on web forms to prevent exploits. In one embodiment, the input validation component comprises an ASP.NET Validator object, which provides methods to be used in screening input supplied by the user of a web application. The input validation component may be used to check any input-related data associated with web application 202, including any of the following, or other, data: Form data (POST data); Query string data (URL parameters); HTTP headers; Cookies. The input validation component may be configured to coexist with other data validation components supplied by the user, including components in Digital Fusion's NET library product(s) and those supplied by Microsoft with ASP.NET, to name a few. As known in the art, ASP.NET enables validators to be run on the client side, on the server side, or both. For security purposes, secure development components 218 may be configured (in one embodiment) to force server-side execution of validator(s). It should be appreciated, however, that client-side validators may also be supported.

The input validation component may be configured to use regular expressions to scan input. For instance, it may support a list of expressions that are provided by a software vendor. In this regard, the vendor may supply the expressions via a data file that may be easily updated without code changes. The software vendor may also supply a simple editor that a developer may use to add additional expressions to the data file.

The input validation component may support both whitelisting and blacklisting of data. Whitelisting includes any means of data validation that strictly specifies what is acceptable input—all other input is rejected. Blacklisting includes any means of data validation that specifies what input is unacceptable—all other input is assumed to be acceptable. Whitelisting is generally preferred in the security community because it is much stricter, and less prone to "zero day" vulnerabilities. When properly implemented, it also has the beneficial side effect of improving the usability of the application. Nonetheless, it should be appreciated that whitelisting, blacklisting, and other data validation methodologies may be employed.

For example, in one embodiment, blacklisting may be used for (1) checking fields such as free-form text boxes that cannot be whitelisted and (2) detecting when potential attacks have occurred for auditing purposes. The whitelisting feature may be configured with a number of expressions for commonly used field types such as, for example, Full Name, Email Address, URL, etc. Blacklisting may also be supported in circumstances in which free-form fields cannot be whitelisted. Because a given piece of user-supplied data might be used in several contexts by the application in the back-end, the input validation component may enable the developer to configure it by identifying how the form data will be used, including: Displayed on a page (Cross-site scripting); Used in a SQL query (SQL injection); Used in an LDAP query (LDAP injection); Used in a filename (directory traversal); Used in a Windows command line (pipes, etc); Used in a Unix command line (rules are different); Used in an HTTP header item in a reply (check for CR/LF); Used in a Cookie (check for script).

Each of the above example checks might correspond to one or more regular expressions in the back end. Checks may default to "on." In this manner, if a software vendor performs an update to add a check for a new type of attack, existing sites will automatically be protected.

In another embodiment, the input validation component may be configured to check for HTML manipulation attacks where an attacker alters the served HTML before posting. This feature may support both static and dynamically generated lists.

With regard to whitelisting of data, the input validation component may support various additional features. For example, the input validation component may enable a developer to choose a data type (e.g., "zip code") to which a given input should match. This will serve to select regular expression(s) against which the data will be matched. The whitelisting feature may support any form of web input, including field forms (POST data), query data (URL parameters), HTTP headers, and cookies, to name a few. The input validation component may also enable checking of HTML form field lengths. The input validation component may also be configured to enable a developer to edit a data type/expression. The list of data types, and their associated regular expressions, may be supplied in a convenient user-readable format such as XML. The developer may edit the list to add their own expressions as desired.

The input validation component may support special filtering for dangerous data types. Some data types may be prone to misuse in indirect attacks against targets other than the web application itself. These will have particularly strict filter rules supplied. For example, these are the cases where the use of multiple regular expressions for a single data type might be required. These data types may include: Internet URLs; Intranet URLs (also allows file://); Domain names; and Email addresses The input validation component may also include a means for checking non-text field types for HTML manipulation attacks. This may include: Check boxes (<INPUT type=checkbox>); Radio buttons (<INPUT type=radio>); Submit buttons (<INPUT type=submit>); Selection lists (<SELECT>); Microsoft_VIEWSTATE hidden field; ASP.NET controls defined in System.Web.UI.WebControls.

The input validation component may support dynamically created HTML. Some selection lists on forms may be dynamically created in server-side user code. The input validation component may be configured to support these.

The input validation component may also log a security message to inform the developer of excessive whitelisting errors.

With regard to blacklisting of data, the input validation component may support various features. The developer may choose one or more data usage (e.g., "in a SQL query") for a given input. This may serve to select regular expression(s) against which the data will be matched. Multiple blacklist types may be applied to a given data type. When blacklisting is chosen for a given piece of data, all selections may default to "on" unless otherwise specified by the user. The input validation component may support all web inputs, including field forms (POST data), query data (URL parameters), HTTP headers, and cookies.

Another embodiment of a secure development component 218 comprises an input filtering component. The input filtering component may be configured to filter HTML input by a web site user for safe later display on a web page. The input filtering component may be configured to remove dangerous elements (e.g., HTML elements tags not explicitly allowed by the developer, <SCRIPT> tags, etc.). The developer may also be able to choose a small subset of simple formatting tags that can be allowed in user input. The list of attributes which may be passed through may be hard-coded. Following is an example of suitable attributes:

<P> for paragraph
<PRE> for preformatted text
<B> for bold
<I> for italic
<U> for underline
<UL> for unordered list
<OL> for ordered list
<LI> for list item
<H1> to <H6> for section headings
<A> for anchors (hyperlinks)
<IMG> for inline images Within the allowed tags, only a subset of attributes may be allowed. All other attributes may be stripped. Following is an example of allowed attributes:

LANG=to specify the language of the included text
SRC=to specify the graphic file to use for an <IMG> tag.
ALT=to specify alternate text for an <IMG> tag.
HREF=to specify the target of an <A> tag.

For the allowed attributes above, the data within may be strictly whitelisted using rules defined within the input validation component. Examples of these rules include:

LANG: Language code (Alphanumeric plus hyphen, 17 characters max)
ALT: Simple text (alphanumeric plus space, hyphen, period, exclamation, comma, semicolon, parentheses, single quote).
HREF, SRC: Strict Internet URL parsing Another embodiment of a secure development component 218 comprises an error handling component. Various secure development components 218 in secure web application development environment 100 may be able to generate events to indicate that certain security-related conditions exist. The developer may handle these at the page level, or applicationwide, to implement his desirable logging strategies. A small bit of glue code may be placed in the appropriate function by a user wizard tool (e.g., Visual Studio Wizard), which will call the error handling component. This function may perform all handling of errors generated by secure development components 218.

Another embodiment of a secure development component 218 comprises a login management component. The login management component may supply objects and methods for authenticating users of a web application. The login management component may provide a sub-classed version of web development platform classes that may automatically perform security-related tasks. For example, the login management component may automatically detect attempts to brute force a password or otherwise abuse the login process, and raise appropriate events that will cause the error handling component to log an appropriate message. The login management component may delay the response when the hack attempts occur, to slow down attempts to brute force a password. The login management component may support easy manipulation of passwords in non-cleartext form. The login management component may be designed with a wrapper that precludes the developers from having to touch the plain-text password in the web application code. A password validator may be supplied for use on a form where the user can select or change their password. This may apply a reasonably strict password policy, such as requiring at least one non-alphanumeric symbol and making sure no component of the user's name or other information is contained within the password.

The login management component may support application-defined password stores. For example, the developer may be able to store user/password information in any way they see fit using their own code. The login management component may hash passwords by default, and hand them to user code in that form. The login management component may encourage strong passwords by supplying a special validator for user-supplied passwords that enforces an appropriately strict set of password selection rules. The login management component may detect attempts to brute-force a login by maintaining a session count of failed logins. The login management component may interact with the error handling component described above to log possible attacks.

Another embodiment of a secure development component 218 comprises an integration component. The integration component provides a means for implementing the other secure development components 218 within a new or existing web application project. The objective of the integration component is to make using secure development components 218 user friendly. The integration component may support various drag-and-drop features, wizards, etc.

The integration component may enable tasks to be imported from a web application assessment tool. In other words, the results of a web application assessment scan may be imported via the integration component. The integration component is configured to filter the imported vulnerabilities to just those that can be solved by the system. Furthermore, the integration component may support vulnerable field information in a task list, so the developer can invoke a wizard to repair, validate, remediate, etc.

Figure 4:
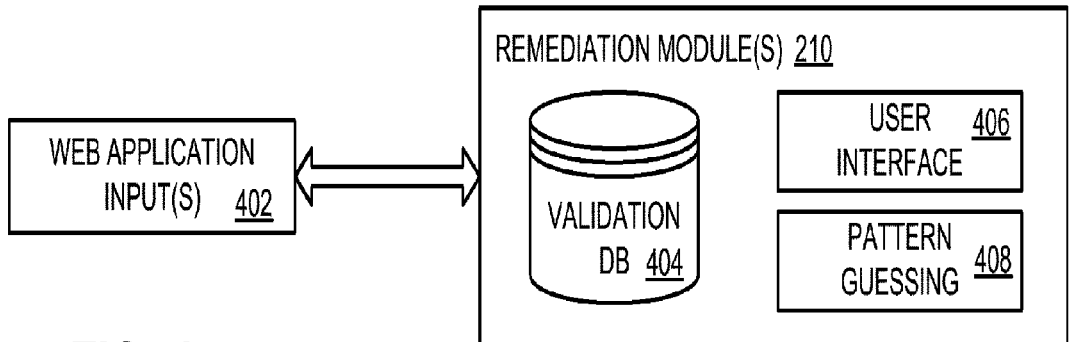
FIG. 4 is a block diagram illustrating an embodiment of the remediation module(s) of FIG. 2.
Figure 3:
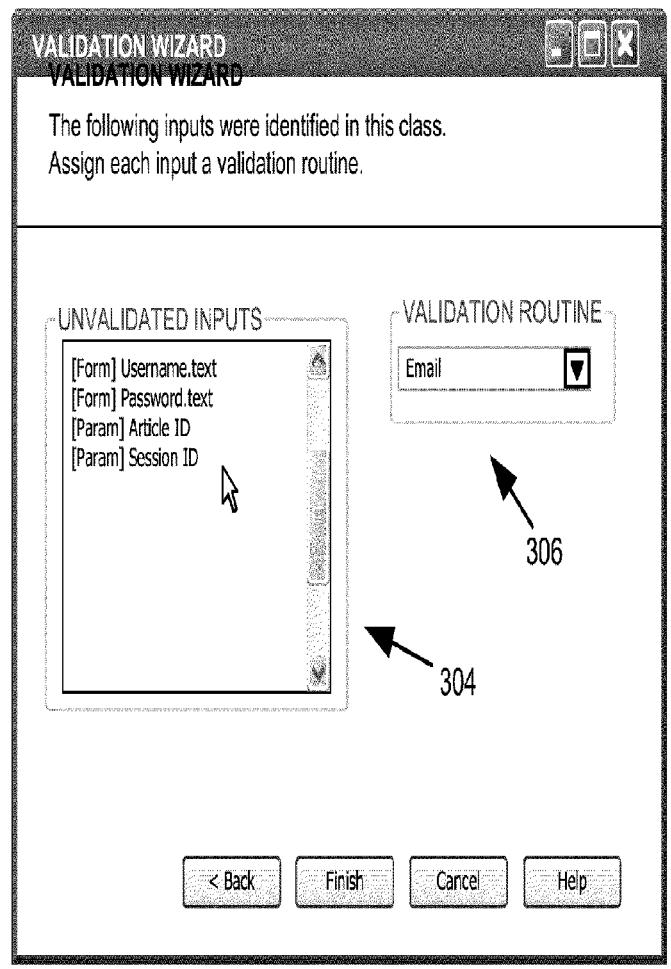
FIG. 3 is a screen shot illustrating an embodiment of the validation wizard of FIG. 2.

As illustrated in FIG. 3, secure web application development environment 100 may support invoking a validation wizard 302 right from the description of the vulnerability. Validation wizard 302 may include a list of unvalidated inputs (list 304—FIG. 3). As further illustrated in FIG. 3, validation wizard 302 may also include a drop-down functionality 306 for choosing a particular validation strategy, routine, etc. In this regard, it should be appreciated that remediation module(s) 210 may include logic, functionality, etc. for recommending validation strategies to the developer via validation wizard 302. Referring to FIG. 4, remediation module(s) 210 may include a validation database 404 that defines strategies for validating certain types of web application input(s) 402 (or other vulnerabilities). Secure web application development environment 100 may also receive input from the developer (via a user interface 406) to facilitate the validation process. Furthermore, remediation module(s) 210 may also include a means for performing pattern guessing (module 408) on web application input(s) 402. For instance, based on the manner that input is presented, the remediation modules attempt to make an educated guess as to what the data represents. For instance, in one embodiment of the invention, the code can be examined to determine the type of data inputs that are available. As a result, a module can be included in the source code to remediate the input and ensure it conforms, if possible, to the required input. Thus, if an email address is expected, the module could examine the input to verify it is in the proper format. If the data looks like a proper email address, however, the character "@" is replaced with a "#" character Referring again to validation wizard 302 illustrated in FIG. 3, a developer may select one of the unvalidated inputs from list 304, and then select a specific validation strategy from the dropValidation wizard 302 may be invoked after an assessment scan is performed and the vulnerability data is imported to the system. Validation wizard 302 may lead the developer directly to the point where repairs need to be made. Validation wizard 302 wizard may analyze source code 204 (both HTML and the code-behind script) and indicate which settings. Buttons in the wizard may be provided to repair vulnerabilities with one click. The wizard may also list individual vulnerabilities related to, for example, Form fields, Query strings (parameters), cookies, etc. This information may come out of the assessment scan and augmented by scanning source code 204. Simple buttons may be provided to apply appropriate input validation to each item by using the input validation component described above.

For instance, if the developer runs a web application assessment scan and gets an "SQL Injection" vulnerability, the wizard enables the developer to select the vulnerability and make the appropriate changes to the application. In addition to repairing forms, the wizard may enable the developer to make other changes to the web application. For example, the wizard may enable the developer to create a global error handler and error page for a web application. The wizard may also be invoked in a batch mode to repair an entire web application. In batch mode, the wizard will scan the entire web application, including all forms.

The integration component may also support a custom wizard that adds a web form to a development project. The custom wizard includes appropriate hooks that support secure object components 218. The custom wizard may support creating the any of the following, or other, types of forms: a general purpose web form (using the input validation component); a login form (using the input validation component and/or the login management component); and a password change form (using the input validation component and/or the login management component).

Another embodiment of a secure object component 218 comprises an encryption component. The encryption component may take on a variety of forms and is not limited to the traditional meaning of encryption. For instance, as used within the context of this description, encryption can refer to any of a variety of secure manipulations to render data unreadable without the requirement of additional effort.

Thus, encryption can also refer to hashing algorithms, compression or other data security techniques. Some web applications may be attacked via methods that rely on internal information leaking from the application, such as sequence numbers or record keys. One way that information can leak from a web application is via cookies which are transmitted by the end user's browser. In order to avoid this type of problem, an encryption component may be used as a means for encrypting the contents of cookies when they are set and decrypting them when they are retrieved. The encryption component may use industry-standard encryption/decryption services, such as those provided by Windows. The encryption component may support easy encryption of cookies as they go to the client, and decryption when they return. Persistent cookies may also be supported, which persist the cryptographic key that is being used. Multi-value cookies may also be supported. For example, multiple name-value pairs in a single cookie may be provided.

Figure 5:
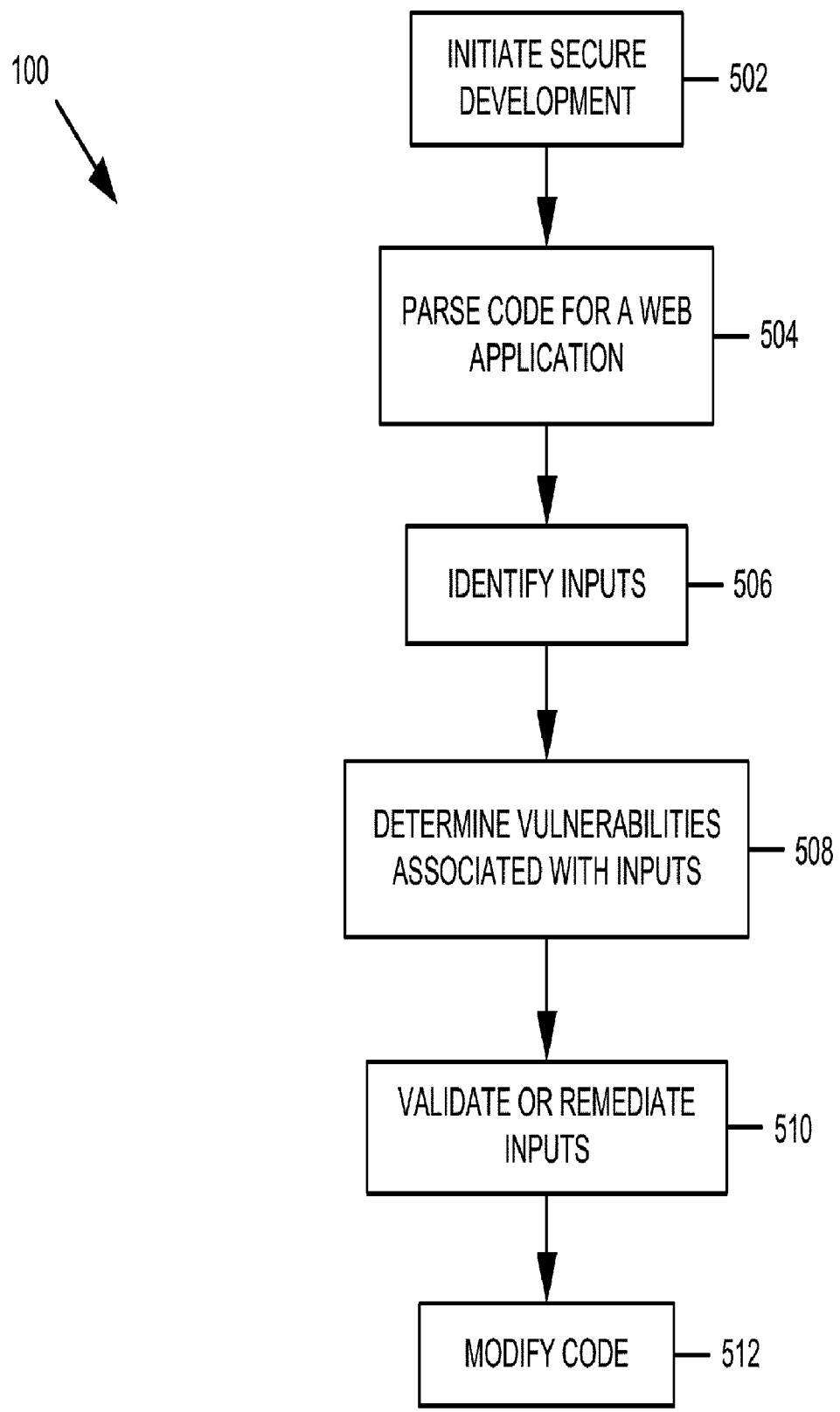
FIG. 5 is a flow chart illustrating the architecture, operation, and/or functionality of an embodiment of the secure web application development environment of FIGS. 1 & 2.
Figure 6:
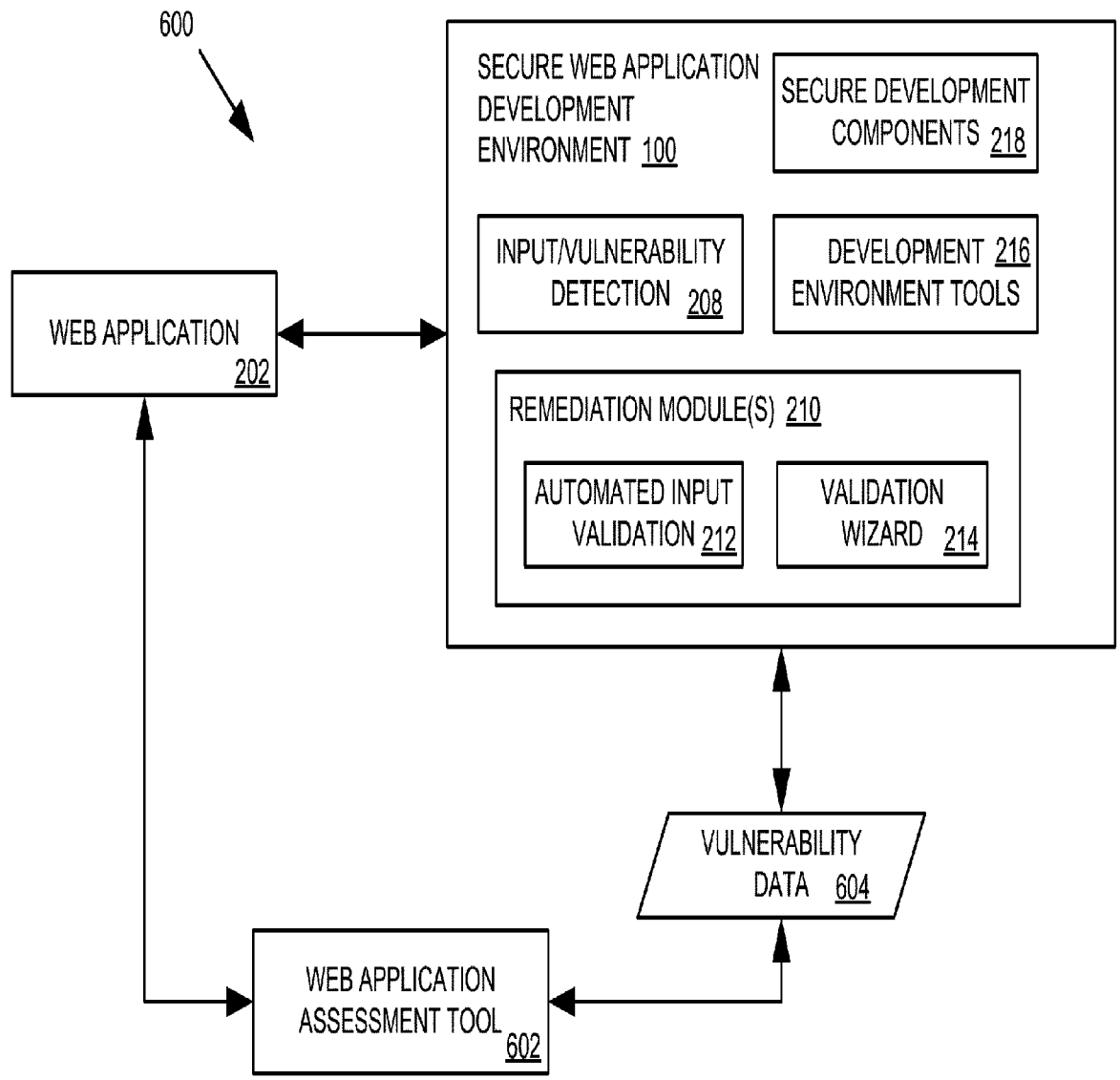
FIG. 6 is a block diagram illustrating another embodiment of a system for implementing a secure web application development environment.

FIG. 5 illustrates the architecture, operation, and/or functionality of another embodiment of secure web application development environment 100. At block 502, secure development is initiated. As illustrated, at block 504, secure web application development environment 100 interfaces with the code associated with the web application being developed. Secure web application development environment 100 may parse the code (or perform other types of code analysis as described above). At blocks 506 and 508, secure web application development environment 100 identifies the inputs or other vulnerabilities associated with the code, which require validation. At block 510, secure web application development environment 100 validates, repairs, remediates, or otherwise resolves the inputs/vulnerabilities. As mentioned above, the resolution of the inputs/vulnerabilities may be performed automatically by appropriate logic (e.g., validation database 404, pattern guessing module 408, etc.). In other embodiments, the inputs/vulnerabilities may be resolved via validation wizard 214 as described above. Regardless of the manner in which the inputs/vulnerabilities are resolved, at block 512, secure web application development environment 100 may modify the code as necessary.

As mentioned above and illustrated in FIG. 6, secure web application development environment 100 may be integrated with a web application assessment tool 602. After web application assessment tool 602 performs a scan of web application 202, the vulnerability data 604 associated with the scan may be provided to secure web application development environment 100. The vulnerability data 604 may be resolved within secure web application development environment 100 as described above.

One of ordinary skill in the art will appreciate that secure web application development environment 100 may be implemented in software, hardware, firmware, or a combination thereof. Accordingly, in one embodiment, secure web application development environment 100 is implemented in software or firmware that is stored in a memory and that is executed by a suitable instruction execution system. In hardware embodiments, secure web application development environment 100 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be further appreciated that the process descriptions or functional blocks in FIGS. 1-6 represent modules, segments, or portions of logic, code, etc. which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, secure web application development environment 100 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although this disclosure describes various embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. A method for developing a secure web application, the method comprising:
   analyzing code, by a computing processor, associated with a web application to identify at least one security vulnerability related to a data entry field of the web application;
   generating validation code, by the processor, to alleviate the security vulnerability, wherein said generating validation code comprises displaying identity of the at least one security vulnerability to a developer of the web application and displaying at least one validation routine, for selection by the developer, to be applied to the at least one security vulnerability;
   inserting the validation code into the web application code to validate proper use of the data entry field associated with the security vulnerability, thereby alleviating the vulnerability;
   checking, by the processor executing the inserted validation code, whether data entered into the data entry field conforms to a predetermined format; and changing, by the processor executing the inserted validation code, the entered data that does not conform to the predetermined format to ensure conformity with the predetermined format.

2. The method of claim 1, wherein the analyzing code associated with the web application comprises analyzing source code associated with the web application.

3. The method of claim 1, wherein the analyzing code associated with the web application comprises performing a static analysis on binary code associated with the web application.

4. The method of claim 1, further comprising providing, with the inserted validation code, a user interface to enable a developer of the web application to select a repair option for invalid data input entered into the data entry field.

5. The method of claim 1, further comprising comparing the at least one security vulnerability to a vulnerability database to identify a recommended validation routine.

6. The method of claim 1, further comprising automatically validating and remediating, with the inserted validation code, data entered into a plurality of data entry fields of the web application.

7. The method of claim 1, further comprising validating, with the inserted validation code, the data entered into the data entry field by wrapping the data input in a validated object, the validated object precluding manipulation of a portion of the data, the portion comprising a plain text password.

8. A system for developing a secure web application, the system comprising:
   a processor;
   memory storing computer executable instructions that when executed by the processor cause the processor to:
   analyze code associated with a web application to identify at least one security vulnerability related to a data entry field of the web application;
   generate validation code to alleviate the security vulnerability, wherein generating validation code comprises displaying identity of the at least one security vulnerability to a developer of the web application and displaying at least one validation routine, for selection by the developer, to be applied to the at least one security vulnerability;
   insert the validation code into the web application code to validate proper use of the data entry field associated with the security vulnerability, thereby alleviating the vulnerability;
   check whether data entered into the data entry field conforms to a predetermined format; and
   change the entered data that does not conform to the predetermined format to ensure conformity with the predetermined format.

9. The system of claim 8, the processor further caused to scan source code associated with the web application to identify the vulnerable data entry fields.

10. The system of claim 8, the processor further caused to provide an interactive wizard to selectively enable a developer of the web application to validate data entered into the vulnerable data entry fields.

11. The system of claim 10, the interactive wizard selectively to provide a recommended validation routine for data entered into at least one of the vulnerable data entry fields to the developer.

12. The system of claim 8, the processor further caused to validate data entered into the vulnerable data entry fields, the data received from a web application assessment tool.

13. The system of claim 8, the processor further caused to wrap code associated with each vulnerable data entry field in a validation object.

14. A non-transitory computer-readable storage device comprising instructions that, when executed, cause one or more processors to:
   analyze code associated with a web application to identify at least one security vulnerability related to a data entry field of the web application
   generate validation code to alleviate the security vulnerability, wherein generating validation code comprises displaying identity of the at least one security vulnerability to a developer of the web application and displaying at least one validation routine, for selection by the developer, to be applied to the at least one security vulnerability;
   insert the validation code into the web application code to validate proper use of the data entry field associated with the security vulnerability, thereby alleviating the vulnerability;
   check whether data entered into the data entry field conforms to a predetermined format;
   change the entered data that does not conform to the predetermined format to ensure conformity with the predetermined format.

15. The storage device of claim 14, the one or more processors further caused to scan source code to identify said vulnerable data entry fields.

16. The storage device of claim 14, the one or more processor further caused to analyze binary code to identify said vulnerable data entry fields.

17. The storage device of claim 14, the one or more processors further caused to provide a user interface that enables a developer to select data entered into an individual identified vulnerable data entry field and a specific routine to validate the data.

* * * * *